United States Patent [19]
Och

[11] Patent Number: 6,009,770
[45] Date of Patent: Jan. 4, 2000

[54] ACTUATION LEVER FOR THE ACTUATION OF A CONTROL LEVER IN AN AUTOMOBILE

[75] Inventor: Roland Och, Rottendorf, Germany

[73] Assignee: ITW-ATECO GmbH, Norderstedt, Germany

[21] Appl. No.: 08/969,353

[22] Filed: Nov. 28, 1997

[30] Foreign Application Priority Data

Dec. 21, 1996 [DE] Germany ............................ 196 53 815

[51] Int. Cl.[7] ............................ G05G 5/06; F16B 39/10; A47B 97/00; A47C 31/00
[52] U.S. Cl. ............................ 74/491; 74/527; 411/119; 297/463.1
[58] Field of Search ............................ 74/567, 568, 569, 74/570, 528, 536, 525, 491, 529, 530, 526; 411/119, 120, 161, 188; 297/463.1

[56] References Cited

U.S. PATENT DOCUMENTS

| | | | |
|---|---|---|---|
| 5,213,004 | 5/1993 | Hoblingre | 74/528 X |
| 5,280,999 | 1/1994 | Jones et al. | 297/361.1 |
| 5,634,380 | 6/1997 | Scholz et al. | 74/528 |

*Primary Examiner*—Tamara L. Graysay
*Assistant Examiner*—Colby Hansen
*Attorney, Agent, or Firm*—Schwartz & Weinrieb

[57] ABSTRACT

Actuation lever for the actuation of a control lever in an automobile, in particular for the actuation of a seat, comprising an eccentric element having an eccentric circumferential surface and a bore, a bearing pin having a threaded portion at one end thereof, the threaded portion being adapted to be threaded into the bore of the eccentric element, the other end of the pin having engagement surfaces for a tool, said actuation lever having a bore, the pin being rotatable supported within the bore of the with a rotation of the eccentric element changing the spacing between the circumferential surface and the control lever, rotation limiting elements being provided upon the eccentric element and upon the control lever adjacent the bore such that in a first axial position of the bearing pin the limiting elements engage each other in order to prevent the eccentric element from rotating, and in a second axial position spaced from the first position the limiting elements are disengaged so as to permit rotation of the eccentric element.

20 Claims, 3 Drawing Sheets

ACTUATION LEVER FOR THE ACTUATION OF A CONTROL LEVER IN AN AUTOMOBILE

FIELD OF THE INVENTION

The invention relates generally to mechanical movements, and more particularly to an actuation lever for the actuation of a control lever in an automobile

BACKGROUND OF THE INVENTION

Seats in automobiles are usually provided with a plurality of actuation levers for seat adjustment. For example, an actuation lever is provided to displace the seat in the longitudinal direction, another actuation lever is provided to adjust the inclination of the seat back, and quite often there is provided a third actuation lever to adjust the height of the seat. The linkage for actuating respective locking elements for the seat adjustment is generally mounted upon the seat. Actuation levers which generally are made of plastic material are assembled thereafter. They are usually mounted so as to be rotatable or pivotal.

Lever linkages and actuation levers are preassembled and thereafter mounted. In this connection manufacturing tolerances cannot be avoided. Consequently there is a risk of an undesired dead stroke (play).

OBJECT OF THE INVENTION

The object underlying the invention is to provide an actuation lever for the actuation of a control lever in an automobile, in particular for the adjustment of a seat wherein any dead stroke or play can be eliminated.

SUMMARY OF THE INVENTION

The invention provides an eccentric element the circumferential surface of which cooperates with a control lever. The eccentric element serves to eliminate a potentional dead stroke as a result of the eccentric element being rotated a predetermined amount that it will engage the control lever. To this end there is provided a bearing pin having a threaded portion which is engaged within a threaded bore of the eccentric element. Engagement between the threaded portion of the bearing pin and the threaded bore within the eccentric element is relatively tight so that rotation of the bearing pin will rotate the eccentric element until it engages the control lever.

The bearing pin is received within a bore of the actuation lever and can be rotated and also axially displaced for a limited amount therein. The eccentric element and the actuation lever include rotation limiting elements which when they are engaged prevent the bearing pin from being rotated. The bearing pin is axially displaceable between two positions, with the rotation limiting means of the eccentric element and the actuation lever being engaged in a first position thereof and being out of engagement in a second position thereof.

When, as described, after assembly of the actuation lever the eccentric element is rotated by means of the bearing pin so as to engage the control lever, such engagement stops rotation of the eccentric element. The bearing pin when being rotated further will be threaded into the threads of the eccentric element so as to pull the eccentric element against the actuation lever such that the rotation limiting means will engage each other. This prevents the eccentric element from being rotated.

Various rotation limiting means of the positive engagement or frictional engagement type are available to prevent the eccentric element from being rotated. One solution, according to the invention, consists in the provision of an annular toothing which is formed upon the eccentric element so as to surround the threaded bore. A complementary toothing is also provided upon the actuation lever so as to surround the bore. Preferably the toothings are of conical shape.

Because the bearing pin and the eccentric element are members separate from the actuation lever, it is desired that the manufacturer pre-mount the bearing pin and the eccentric element upon the actuation lever before they are mounted upon the driver's seat. Preassembly, however, must be performed so as to avoid the risk of the parts being released from each other inadvertently. This is why an embodiment of the invention provides that the bearing pin has a head opposite to the end including the threaded portion, the head having a non-circular outer contour, the actuation lever having a bore portion coaxial to the bore of the eccentric element and spaced therefrom, the bore of the eccentric element portion having a cross-section which is complementary to the outer contour of the head, releasable locking means coacting between the head and the bore portion, the locking means being designated such that they are to be overcome if the bearing pin is actuated to be moved from the first position towards the eccentric element into the second position. As a result prior to assembly, a predetermined position of the eccentric element and the bearing pin is provided wherein the eccentric element is fixed in its rotary position. At the same time the parts are prevented from being released from the actuation lever. The external periphery of the eccentric element when in a predetermined rotary position has a maximal spacing from the control lever when the actuation lever has been mounted. This rotary position is being set by the eccentric element in the described manner during preassembly of the actuation lever so that this allows one to perform the setting by rotating the eccentric element. To this end it is necessary to release the locking means when the bearing pin is displaced to the second axial position. To this end, in a further modification of the invention, a locking cam can be formed upon the periphery of the head of the bearing pin, which cam prevents the head from being easily displaced through the bore portion. The non-circular contour of the head, which is for example hexagonal, ensures that the pin is prevented from being rotated when the head has been received in the bore portion. When the bearing pin is displaced into the second axial position while it releases the locking elements, the rotation limiting means will be disengaged, and the bearing pin and accordingly the eccentric element can now be rotated until the eccentric element engages the control lever. Further rotation of the bearing pin will cause the eccentric element to be axially displaced with respect to the actuation lever until the rotation limiting means comes into engagement whereby the eccentric element is then stationary both in axial and circumferential or rotary directions.

In accordance with a further modification of the invention the head includes a radial projection which engages a corresponding notch within the bore portion. This allows one to identify the orientation of the outer periphery of the eccentric element.

It should be understood that the described interengagement of the actuation lever and the control lever may be released again. To this end, the bearing pin is rotated in the opposite rotary direction so that the rotation limiting means of the actuation lever and the eccentric element will be disengaged.

BRIEF DESCRIPTION OF THE DRAWINGS

The invention will now be explained in more detail as set forth in the following detailed description and with reference to the drawings in which like reference characters designate like or corresponding parts throughout the several views, and wherein.

DETAILED DESCRIPTION OF THE PREFERRED EMBODIMENT

Figure 1:
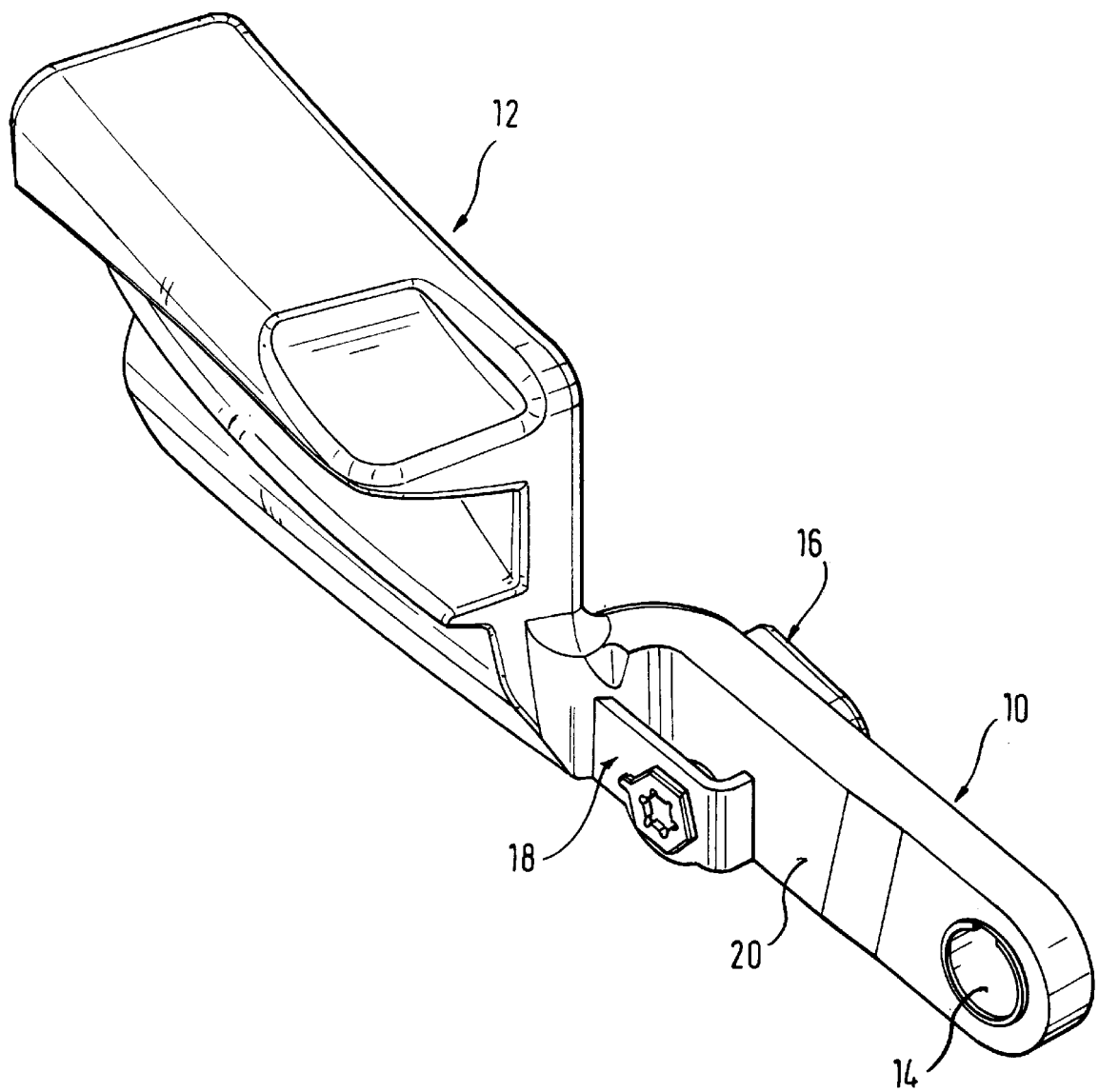
FIG. 1 is a perspective view of an actuation lever including a rotatable eccentric element according to the invention.

FIG. 1 is a perspective view of an actuation lever 10 which is integral with a handle 12. In the area of the free end the lever 10, there is a through-bore 14 for pivotally mounting the lever 10, for example, to the frame of a vehicle seat.

An eccentric element 16 which will be described further in the following is positioned at the rear side of the lever 10 (in FIG. 1). On the front side in FIG. 1 a strap member 18 is mounted upon the lever 10 in spaced relationship to an adjacent surface 20 of the lever 10. Further details of the lever 10 will be explained with reference to FIGS. 5 and 6.

Figure 3:
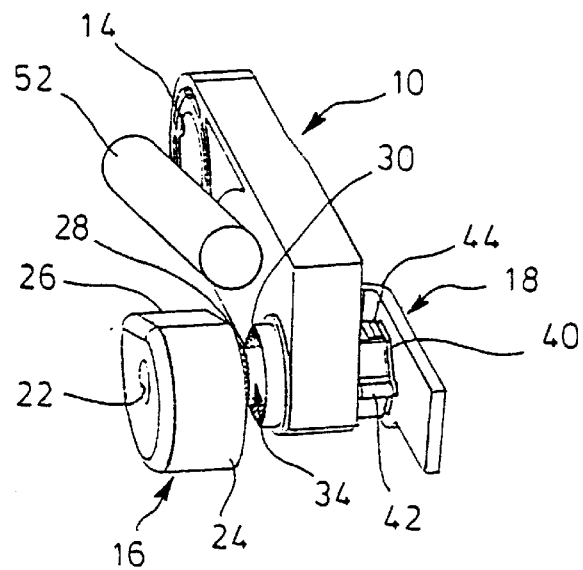
FIG. 3 is a perspective view similar to that of FIG. 2 showing the setting condition of the actuation lever in FIG. 1.
Figure 4:
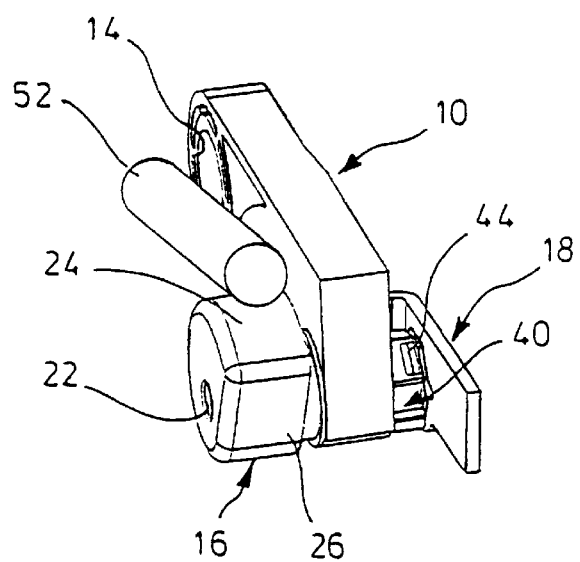
FIG. 4 is a perspective view showing the final position of the set actuation lever in FIG. 1.
Figure 5:
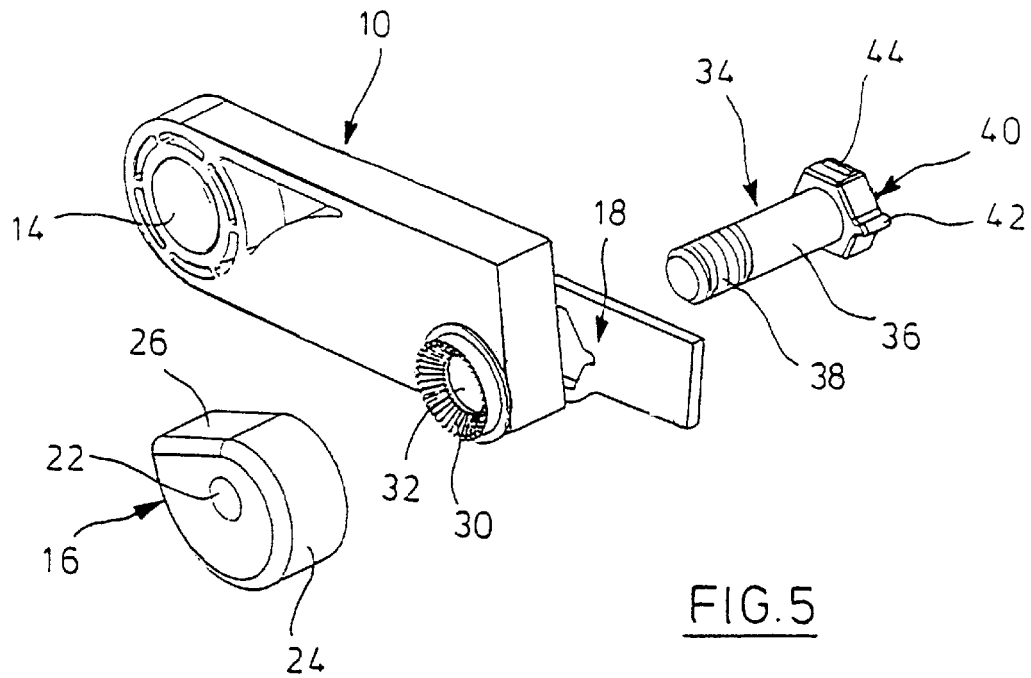
FIG. 5 is a perspective exploded view of the actuation lever in FIG. 4 from a first direction.
Figure 6:
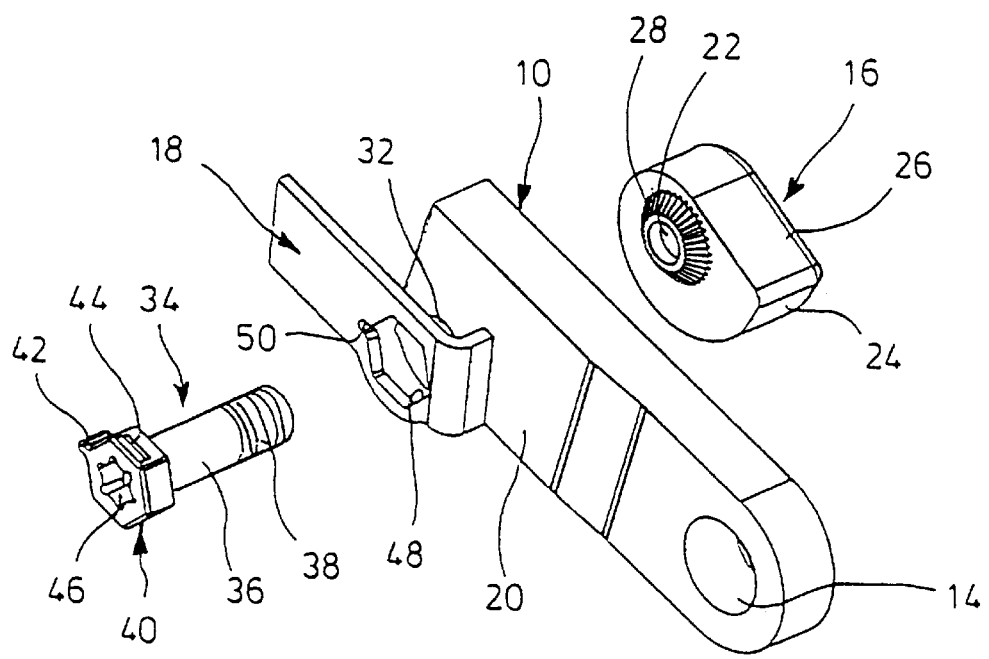
FIG. 6 is a perspective exploded view of the assembly in FIG. 5 from a second opposite direction.

FIG. 2 to 6 show only the actuation lever assembly. The handle 12 which is integral with the lever 10 has been omitted for clarity reasons. FIGS. 5 and 6 show more clearly the eccentric element 16. It includes a bore 22 and has a circumferential surface 24 which is of spiral shape with respect to the axis of the bore 22. It has a planar surface 26 in the area of minimal spacing between the peripheral surface and the axis. The bore 22 of the eccentric element 16 has internal threads (not shown). At its inner side it has a conical annular toothing 28. The annular toothing 28 cooperates with a conical annular internal toothing 30 which surrounds a bore 32 of the actuation lever 10. The toothings 28, 30 are of complementary shape so that the eccentric element 16 is prevented from being rotated when the eccentric element 16 engages the actuating lever 10 and the toothings 28, 30 are in engagement with each other.

FIG. 5 shows a bearing pin 34 which has a threaded portion 38 in the area of the free end of a shank 36. At the other end there is provided a head 40 which is of hexagonal shape and which has a radial projection 42 on a peripheral edge area. Furthermore the head 40 has cams 44 on opposite sides. As may be seen in FIG. 6 the head 40 has on its outside a hexagonal recess 46 or the like for engagement by a respective tool.

The strap member 18 has an aperture 48 which is coaxial to the bore 32 of the actuation lever 10 and conforms to the shape of the head 40 of the bearing pin 34. The aperture 48 has a radial notch 50 into which the projection 42 fits. The cams 44 are dimensioned such that the head 40 can be pushed by a certain force through the aperture 48 into the space between the strap member 18 and the adjacent surface 20 of the actuation lever 10.

Figure 2:
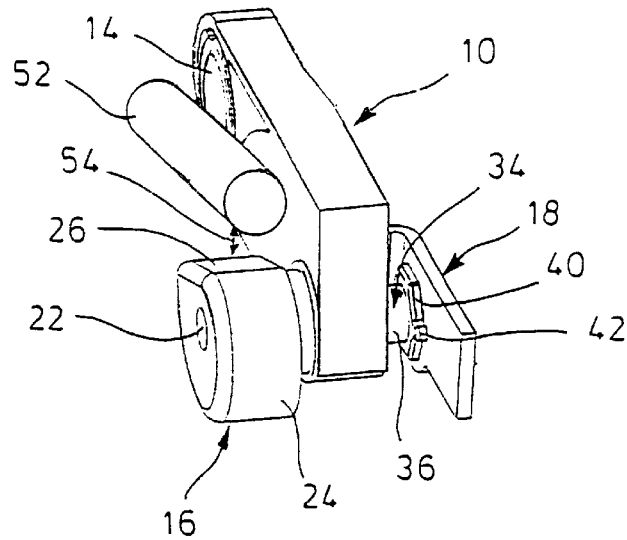
FIG. 2 is a perspective view showing the pre-assembly condition of the actuation lever in FIG. 1.

FIG. 2 shows the actuation lever 10 of FIGS. 5 and 6 in the assembled condition. The head 40 of the bearing pin 34 has been inserted through the aperture 48, with the cams 44 lying on the free side of the strap member 18. When the bearing pin 34 is in this axial position, the toothings 28, 30 of the eccentric element 16 and the actuation lever 10 engage each other so that the eccentric element 16 cannot be rotated. The bearing pin 34 furthermore is axially fixed even though it can be moved from this position by exerting a greater axial force upon the bearing pin 34 in the direction of the actuation lever 10 and, respectively, the eccentric element 16. The actuation lever 10 is being delivered when it is in this condition and before it is being assembled in a vehicle seat. The rotary position of the eccentric element 16 with respect to a control lever indicated at 52 is such that there will be a maximal spacing 54 from the peripheral surface 24 and, respectively, 26 of the eccentric element 16.

The setting of the eccentric element 16 may be understood from FIG. 3. To this end the bearing pin 34 has its head 40 pushed through the aperture 48 while the resistance resulting from cooperation of the cam 44 and the aperture 48 is being overcome so that the head 40 will be in the space between the strap member 18 and the adjacent outer surface of the actuation lever 10. The toothings 28, 30 are disengaged. A tool which cooperates with the hexagonal recess 46 or the like will be used to rotate the bearing pin 34 until the spiral surface 24 engages the control lever 52. The eccentric element 16 will be moved thereby due to friction between the threads of the threaded portion 38 of the bearing pin 34 and the threads of the bore 22 of the eccentric element 16. As soon as the above described engagement has been reached, the eccentric element 16 cannot be rotated any further. Further rotation of the bearing pin 34 will therefore cause the threaded portion 38 to move farther into the threaded bore whereby the eccentric element 16 is pulled against the actuation lever 10. The toothings 28, 30 will then come into engagement, and the eccentric element 16 will then be fixed in its angular position. This is indicated in FIG. 4.

Obviously, many modifications and variations of the present invention are possible in light of the above teachings. It is therefore to be understood that within the scope of the appended claims, the present invention may be practiced otherwise than as specifically described herein.

I claim:

1. An actuation lever assembly for the actuation of an associated element, comprising:

an actuation lever having a bore defined therethrough;

an eccentric element having an eccentric circumferential surface and a threaded bore defined therein;

a bearing pin having a threaded portion at one end thereof for threaded engagement within said threaded bore of said eccentric element, the other end of said bearing pin having engagement means for receiving a tool by which said bearing pin may be rotated, and a shank portion rotatably supported and axially movable within said bore of said actuation lever, rotation of said bearing pin with respect to said actuation lever causing the eccentric element to be rotated so as to change said disposition of said circumferential surface of said eccentric element with respect to the associated element to be actuated; and first and second rotation limiting means respectively provided upon said eccentric element and said actuation lever such that when said bearing pin is disposed at a first axial position with respect to said actuation lever, said first and second rotation limiting means of said eccentric element and the actuation lever are engaged with each other so as to prevent said eccentric element from rotating with respect to said actuation lever, while when said bearing pin is disposed at a second axial position, axially spaced from said first axial position, with respect to said actuation lever, said first and second rotation limiting means of said eccentric element and said actuation lever are disengaged from each other so as to permit said eccentric element to rotate with respect to said actuation lever.

2. The actuation lever assembly of claim 1, wherein:

said first and second rotation limiting means comprises first and second annular sets of teeth respectively provided upon said eccentric element and said actuation lever.

3. The actuation lever assembly of claim 2, wherein:

said first and second annular sets of teeth disposed upon said eccentric element and said actuation lever have substantially conical configurations.

4. The actuation lever assembly of claim 1, wherein:

said bearing pin has a head disposed opposite to said end including said threaded portion and said head has a non-circular external configuration;

said actuation lever having a bore portion coaxial to said bore of said actuation lever and axially spaced therefrom, said bore portion having a cross section which is complementary to said external configuration of said head of said bearing pin; and releasable locking means coacting between said head of said bearing pin and said bore portion of the actuation lever so as to prevent said bearing pin from being rotated with respect to said actuation lever when said bearing pin is disposed at said first axial position, and released with respect to each other so as to permit the bearing pin to rotate with respect to said actuation lever when said bearing pin is moved from said first axial position to said second axial position.

5. The actuation lever assembly of claim 4, wherein:

said bore portion of said actuation lever is formed upon a flanged strap portion of said actuation lever which extends parallel to said actuation lever and is axially spaced therefrom.

6. The actuation lever assembly of claim 5, wherein:

said head of said bearing pin is provided at least with one cam projection for engaging inner and outer surface portions of said flange portion of said actuation lever so as to assist retention of said bearing pin at said first and second axial positions.

7. The actuation lever assembly of claim 4, wherein:

said head of said bearing pin has a substantially hexagonal external configuration.

8. The actuation lever assembly of claim 4, wherein said releasable locking means of said head of said bearing pin comprises a radial projection, and said releasable locking means of said bore portion of said actuation lever comprises a notch within which said radial projection of the head of said bearing pin is disposed.

9. The actuation lever assembly of claim 1, wherein:

said bearing pin comprises a head portion; and said engagement means of said bearing pin, which is externally accessible for engagement with a tool by means of which said bearing pin is rotated, comprises a recess defined within said head portion of the bearing pin for receiving a tool inserted therein.

10. An actuation lever assembly for said actuation of a vehicle seat control lever in an automobile, comprising:

a vehicle seat control lever;

an actuation lever having a bore defined therethrough;

an eccentric element having an eccentric circumferential surface and a threaded bore defined therein;

a bearing pin having a threaded portion at one end thereof for threaded engagement within said threaded bore of the eccentric element, said other end of said bearing pin having engagement means for receiving a tool by which said bearing pin may be rotated, and a shank portion rotatably supported and axially movable within said bore of said actuation lever, rotation of said bearing pin with respect to said actuation lever causing said eccentric element to be rotated so as to change the disposition of said circumferential surface of said eccentric element with respect to said vehicle seat control lever to be actuated; and first and second rotation limiting means respectively provided upon said eccentric element and said actuation lever such that when said bearing pin is disposed at a first axial position with respect to said actuation lever, said first and second rotation limiting means of said eccentric element and said actuation lever are engaged with each other so as to prevent said eccentric element from rotating with respect to said actuation lever, while when said bearing pin is disposed at a second axial position, axially spaced from said first axial position, with respect to said actuation lever, said first and second rotation limiting means of said eccentric element and said actuation lever are disengaged from each other so as to permit said eccentric element to rotate with respect to said actuation lever and said vehicle seat control lever and thereby engage said vehicle seat control lever.

11. The actuation lever assembly of claim 10, wherein:

said first and second rotation limiting means comprises first and second annular sets of teeth respectively provided upon said eccentric element and said actuation lever.

12. The actuation lever assembly of claim 11, wherein:

said first and second annular sets of teeth disposed upon said eccentric element and said actuation lever have substantially conical configurations.

13. The actuation lever assembly of claim 10, wherein:

said bearing pin has a head disposed opposite to said end including said threaded portion and said head has a non-circular external configuration;

said actuation lever having a bore portion coaxial to said bore of said actuation lever and axially spaced therefrom, said bore portion having a cross section which is complementary to said external configuration of said head of said bearing pin; and releasable locking means coacting between said head of said bearing pin and said bore portion of said actuation lever so as to prevent said bearing pin from being rotated with respect to said actuation lever when said bearing pin is disposed at said first axial position, and released with respect to each other so as to permit said bearing pin to rotate with respect to said actuation lever when said bearing pin is moved from said first axial position to said second axial position.

14. The actuation lever assembly of claim 13, wherein:

said bore portion of said actuation lever is formed upon a flange portion of said actuation lever which extends parallel to said actuation lever and is axially spaced therefrom.

15. The actuation lever assembly of claim 14, wherein:

said head of said bearing pin is provided with at least one cam projection for engaging inner and outer surface portions of said flange portion of said actuation lever so as to assist retention of said bearing pin at said first and second axial positions.

16. The actuation lever assembly of claim 13, wherein:

said head of said bearing pin has a substantially hexagonal external configuration.

17. The actuation lever assembly of claim 10, wherein:

said engagement means of said head of said bearing pin, which is externally accessible for engagement with a tool by means of which said bearing pin is rotated, comprises a recess defined within said head of said bearing pin for receiving a tool inserted therein.

18. The actuation lever assembly of claim 13, wherein:

said releasable locking means of said head of the bearing pin comprises a radial projection, and said releasable locking means of said bore portion of said actuation lever comprises a notch within which said radial projection of said head of said bearing pin is disposed.

19. A method of positionally setting an actuator lever assembly with respect to an associated element, comprising said steps of:

providing an actuation lever having a bore defined therethrough;

providing an eccentric element having an eccentric circumferential surface and a threaded bore defined therein;

providing a bearing pin having a threaded portion at one end thereof for threaded engagement within said threaded bore of said eccentric element, said other end of said bearing pin having engagement means for receiving a tool by which the bearing pin may be rotated, and a shank portion rotatably supported and axially movable within said bore of said actuation lever;

providing first and second rotation limiting means respectively upon said eccentric element and said actuation lever;

inserting said shank portion of said beating pin through said bore of said actuation lever and threadedly engaging the threaded portion of said bearing pin with said threaded bore of said eccentric element such that said bearing pin is disposed at a first axial position with respect to said actuation lever at which said first and second rotation limiting means of said eccentric element and said actuation lever are engaged with each other so as to prevent said eccentric element, which is disengaged from said associated element, from rotating with respect to said actuation lever and toward said associated element;

axially moving said bearing pin from said first axial position to a second axial position, axially spaced from said first axial position, with respect to said actuation lever such that said first and second rotation limiting means of said eccentric element and said actuation lever are disengaged from each other so as to permit said eccentric element to rotate with respect to said actuation lever and said associated element and thereby engage said associated element;

rotating said bearing pin, and therefore said eccentric element, with respect to said actuation lever such that the eccentric element engages said associated element; and continuing to rotate said bearing pin, after said engagement of said eccentric element with said associated element, such that said bearing pin rotates with respect to said eccentric element so as to axially move said eccentric element with respect to said bearing pin as a result of the threaded engagement therebetween whereby said first and second rotation limiting means will again engage each other so as to rotatably lock said eccentric element at said engaged position with respect to said associated element.

20. Thee method as set forth in claim 19, wherein:

said associated element is a vehicle seat control lever of an automobile.

* * * * *